US010691919B1

(12) United States Patent
Bauchspies

(10) Patent No.: US 10,691,919 B1
(45) Date of Patent: Jun. 23, 2020

(54) DYNAMIC REGISTRATION USING MULTIPLE MATCH ENROLLMENT

(71) Applicant: IDEX ASA, Fornebu (NO)

(72) Inventor: Roger A. Bauchspies, Gustine, CA (US)

(73) Assignee: IDEX ASA, Fornebu (NO)

( * ) Notice: Subject to any disclaimer, the term of this patent is extended or adjusted under 35 U.S.C. 154(b) by 0 days.

(21) Appl. No.: 15/455,128

(22) Filed: Mar. 9, 2017

(51) Int. Cl.
*G06K 9/00* (2006.01)

(52) U.S. Cl.
CPC .................. *G06K 9/00087* (2013.01)

(58) Field of Classification Search
CPC .................. G06K 9/00087; G06K 9/00013
See application file for complete search history.

(56) References Cited

U.S. PATENT DOCUMENTS

| 7,885,436 B2 | 2/2011 | Russo et al. |
| 9,135,494 B2 | 9/2015 | Boshra et al. |
| 9,471,765 B1 | 10/2016 | Setterberg et al. |
| 2016/0026840 A1* | 1/2016 | Li .................. G06K 9/00013 348/77 |
| 2017/0061196 A1* | 3/2017 | Russo ............... G06K 9/6202 |

* cited by examiner

*Primary Examiner* — Ruiping Li
(74) *Attorney, Agent, or Firm* — Kilpatrick Townsend & Stockton LLP

(57) ABSTRACT

A system and method for selectively enrolling new pattern information in a way that reduces incorrect mapping or reduces overuse of previously mapped pattern information using a multi-match model. A method for dynamically enrolling a pattern-under-test into a pattern template, the pattern template including a set of template elements, may include a) determining a number N of template elements of the set of template elements matched by the pattern-under-test, wherein N is greater than one; b) establishing a multi-match mode for a dynamic enrollment of the pattern-under-test into the pattern template; and c) enrolling dynamically the pattern-under-test responsive to the multi-match mode.

20 Claims, 2 Drawing Sheets

DYNAMIC REGISTRATION USING MULTIPLE MATCH ENROLLMENT

FIELD OF THE INVENTION

The present invention relates generally to pattern matching, and more specifically, but not exclusively, to dynamic enrollment of pattern information, such as fingerprints or other biometric patterns, using a multi-match model.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Dynamic registration (DR), or dynamic enrollment as it is sometimes known, includes a pattern matching system in which limited initial trusted pattern information is enrolled into a trusted pattern storage to create a secure template against which to match the pattern. For example, a common application of DR is to enroll biometric data of a person, such as a fingerprint, into memory on a smartphone. During use, different implementations employ different rules that are used to enhance the limited initial trusted pattern information.

DR may be preferable for fingerprint sensors with a sensing area smaller than an average fingerprint region in that the system can quickly capture multiple images of a finger region during the trusted enrollment process. A DR system may collect information over time to increase the pattern region mapped by the enrolled data.

A potential drawback to DR is that adding data to a secure template has a risk of adding data from an incorrectly matched user or pattern source. Another drawback may be that continually remapping the same region of a pattern source, as opposed to gathering data from a variety of different regions of a pattern source, can result in a slowness of matching.

It may be desirable to provide a dynamic registration system that selectively enrolls new pattern information in a way that reduces incorrect mapping or reduces overuse of previously mapped pattern information.

BRIEF SUMMARY OF THE INVENTION

Disclosed is a system and method for selectively enrolling new pattern information in a way that reduces incorrect mapping or reduces overuse of previously mapped pattern information using a multi-match model. The following summary of the invention is provided to facilitate an understanding of some of the technical features related to dynamic enrollment of pattern information using a multi-match model, and is not intended to be a full description of the present invention. A full appreciation of the various aspects of the invention can be gained by taking the entire specification, claims, drawings, and abstract as a whole. The present invention is applicable to other biometric pattern information in addition to fingerprint information and to other pattern dynamic registration system in addition to dynamic enrollment of biometric patterns.

An embodiment of the present invention may require a minimum number of multiple independent matches of a pattern-under-test to multiple distinct template elements of a trusted template before dynamically enrolling information from the pattern-under-test into the trusted template. This multi-match of template elements may increase a confidence level that the pattern-under-test is properly associated with the trusted template.

An embodiment of the present may set a maximum number of multiple independent matches of a pattern-under-test to multiple distinct template elements of a trusted template before disabling a dynamic enrollment of information from the pattern-under-test into the trusted template. This enrollment exclusion based upon multi-matches of template elements may increase a confidence level that the pattern-under-test has not been associated with too many template elements of the trusted template (e.g., that the pattern-under-test is not contributing much, if any, new information).

An embodiment of the present invention may combine both the minimum and maximum values for multi-matching to set a multi-match range. When a pattern-under-test matches a number of template elements of the trusted template that are within this range, the system will dynamically enroll information from the pattern-under-test into the trusted template. This multi-match using a range helps to balance increasing confidence that the pattern-under-test is properly matched to the trusted template while reducing a risk of overmapping information already in the trusted template.

A computer-implemented method for dynamically enrolling a pattern-under-test into a pattern template, the pattern template including a set of template elements executing, using at least one processor, instructions recorded on a non-transitory computer-readable medium, including: a) determining, using the at least one processor, a number N of template elements of the set of template elements matched by the pattern-under-test, wherein N is greater than one; b) establishing, using the at least one processor, a multi-match mode for a dynamic enrollment of the pattern-under-test into the pattern template; and c) enrolling dynamically the pattern-under-test responsive to the multi-match mode.

A non-transitory computer-readable medium for dynamically enrolling a pattern-under-test into a pattern template, the pattern template including a set of template elements, including instructions stored thereon, that when executed on at least one processor, perform the steps of: a) determining, using the at least one processor, a number N of template elements of the set of template elements matched by the pattern-under-test, wherein N is greater than one; b) establishing, using the at least one processor, a multi-match mode for a dynamic enrollment of the pattern-under-test into the pattern template; and c) enrolling dynamically the pattern-under-test responsive to the multi-match mode.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Figure 1:
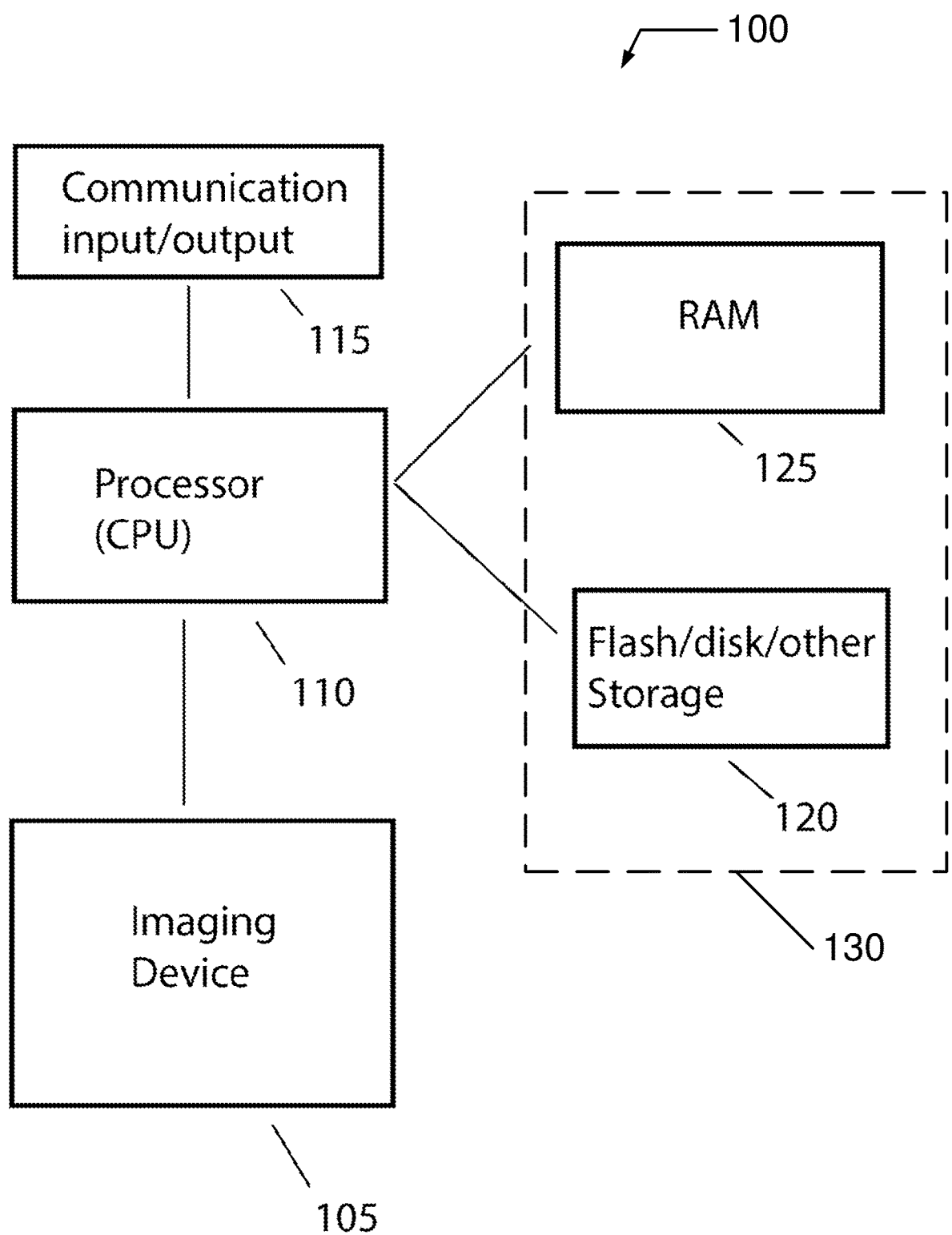
FIG. 1 illustrates a block schematic diagram of an embodiment for a pattern matching system.

Embodiments of the present invention provide a system and method for selectively enrolling new pattern information in a way that reduces incorrect mapping or reduces overuse of previously mapped pattern information using a multi-match model. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Definitions

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The following definitions apply to some of the aspects described with respect to some embodiments of the invention. These definitions may likewise be expanded upon herein.

As used herein, the term "or" includes "and/or" and the term "and/or" includes any and all combinations of one or more of the associated listed items. Expressions such as "at least one of," when preceding a list of elements, modify the entire list of elements and do not modify the individual elements of the list.

As used herein, the singular terms "a," "an," and "the" include plural referents unless the context clearly dictates otherwise. Thus, for example, reference to an object can include multiple objects unless the context clearly dictates otherwise.

Also, as used in the description herein and throughout the claims that follow, the meaning of "in" includes "in" and "on" unless the context clearly dictates otherwise. It will be understood that when an element is referred to as being "on" another element, it can be directly on the other element or intervening elements may be present therebetween. In contrast, when an element is referred to as being "directly on" another element, there are no intervening elements present.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "connect," "connected," and "connecting" refer to a direct attachment or link. Connected objects have no or no substantial intermediary object or set of objects, as the context indicates.

As used herein, the terms "couple," "coupled," and "coupling" refer to an operational connection or linking. Coupled objects can be directly connected to one another or can be indirectly connected to one another, such as via an intermediary set of objects.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "optional" and "optionally" mean that the subsequently described event or circumstance may or may not occur and that the description includes instances where the event or circumstance occurs and instances in which it does not.

As used herein, the term "fingerprint" means a map of contrasting amplitude elements from a pattern source. As such, a ridge/furrow pattern on a human finger is included as a fingerprint. Additionally, zebra stripe patterns, retinal vein patterns, or other collections of contrasting amplitude elements having a set of a plurality of sufficiently long succession of similarly contrasted elements.

As used herein, the terms "match," "matching," and "matches" refer to a conclusion of a comparison of a first pattern (e.g., a first image portion of a first impression from a sensor) against a second pattern (e.g., a second image portion of a second impression from the sensor) that means that a pattern source used in the first impression is the same pattern source, within a sufficient confidence interval appropriate to the application, used in the second impression. A match does not require 100% commonality of features between the first and second patterns. One hundred percent, and nearly 100% (for example 95% commonality—depending upon application), commonality is referred to as a duplicate image. This results when the user places the same portion of the same finger on the sensor from two or more impressions. Sometimes a match is a determination from a matcher process or matcher engine, which can have a particular special meaning. Some embodiments of the present invention include just such a matcher process. However, the present invention is not constrained to determining matches in this fashion; the present invention includes use of an alignment engine for evaluating the condition of a match or a non-match between comparisons of a set of patterns.

As used herein, the terms "correlate," "correlating," and "correlated" refer to a conclusion of a comparison of a first pattern (e.g., a first image portion of a first impression from a sensor) against a second pattern (e.g., a second image portion of a second impression from the sensor) that means that a pattern source used in the first impression is the same pattern source, within a sufficient confidence interval appropriate to the application, used in the second impression without a match between the first pattern and the second pattern. Correlation is found by matching intermediate patterns that provide a bridge between the first pattern and the second pattern. For example, a second pattern may not match the first pattern, but may match a third pattern, with the third pattern matching the first pattern. Correlation may be found by one or more intermediate matches between the second pattern and the first pattern.

As used herein, the terms "near realtime" refers to a practicality of a time delay introduced, by automated data processing or data transmission, between an occurrence of an event of receiving a pattern impression from application of a pattern source to a pattern impressioner (e.g., an imager to create a bitmap image of a portion of a pattern associated the pattern source) and the subsequent processing of data for that pattern impression (e.g., a bitmap image), such as for display, feedback, or control purposes. Depending upon a processing speed, it may be possible to make multiple pattern impressions before a first pattern impression is processed. Some embodiments of the present invention process serial pattern impressions from a user in realtime or near realtime which may be considered equivalent when the processing delay is imperceptible to a user. For realtime, and near realtime embodiments, it is considered that pattern impressions are taken and processed serially, that is an impression and processing/feedback is provided before a next following pattern impression is processed.

In general, a pattern source (e.g., a finger) may include a pattern (e.g., a fingerprint). For a system that does not process the pattern (fingerprint) directly, the system may process a representation (e.g., a pattern map) of the pattern (fingerprint). When a user uses an impressioner (e.g., places a pattern source (finger) on a sensor or imager or other impression producing structure), the system may produce an impression (e.g., an image) of a portion of the pattern (fingerprint) of the pattern source (finger) of the user. After registration during operation when receiving pattern information, the system and method may not, and typically does not, have a priori knowledge that an incoming set of pattern information is in fact from the pattern. To reflect this, any pattern providing the incoming set of pattern information may be referred to as a pattern-under-test. Impressions (images) may be collected and evaluated, in bulk or in realtime or in near realtime from one or more patterns-under-test depending upon a particular implementation.

The pattern storage includes a set of stored patterns that are tested against during system operation. Each stored pattern may each be defined by a pattern template, one such template for each stored pattern. Each template in turn includes a number of template elements. For some implementations, the matching system may be configured to test whether the pattern-under-test matches any specific pattern of the set of stored patterns by evaluating whether a template element of that specific pattern matches to the pattern-under-test. In that configuration, the matching system may stop upon detection of a first match condition.

Dynamic registration, or alternatively dynamic enrollment, may be used to improve a quality of the trusted pattern information collected and stored during an initial trusted enrollment phase. The trusted pattern information may be organized in many different ways, and alternative ways may share some common features. For example, each trusted pattern stored in the trusted pattern store may be categorized as a pattern template. Each pattern template may include template elements, data components that define discrete matchable units used by a matching process to evaluate a match condition of a pattern-under-test against a particular pattern template including those discrete matchable units.

A system or process implementing an embodiment of the present invention may have one or more concerns, including: a) improving false acceptance rates for dynamic data enrolled into a trusted pattern template to reduce incorrectly matched data that may degrade subsequent operation of the system or process; b) improving performance (e.g., improving a match speed, reducing a use of memory and/or power) by avoiding or minimizing reuse of known information when dynamically enrolling new information into a trusted pattern template; or c) combinations of a) and b).

The system or process may implement different multi-match modes to selectively address a), b), and/or c), and these modes may be static (e.g., fixed at initial values) or dynamically reconfigured (e.g., able to be modified from initial values, either manually or autonomously based upon a set of rules or other selection criteria). For example, a first multi-match mode may define a minimum match value (MIN) that may address concern a). The minimum match value MIN determines how many distinct template elements of a trusted pattern template must be independently matched against a pattern-under-test before information from that pattern-under-test may be used to dynamically update that trusted pattern template. For example, the minimum match value MIN may be a value greater than one, more preferably a value in a range of 2-5, and most preferably a value of 4.

A second multi-match mode may define a maximum match value MAX that may address concern b). The maximum match value MAX determines how many distinct template elements of a trusted pattern template are allowed to be independently matched against a pattern-under-test before information from that pattern-under-test is disabled from dynamically updating that trusted pattern template. The maximum match value MAX is limited by the number of template elements T in the specific trusted pattern template which may include up to 30 template elements or sometimes more. There may be many different considerations for defining the maximum match value MAX. For example, the maximum match value MAX may be a predetermined fraction of T (e.g., T/X, X>1), a predetermined multiple of the minimum match value MIN (e.g., MIN*Y, Y>1, Y preferably in a range of 2-4) or some other value based upon the particulars of any given implementation, which may include an imaging size of a sensor collecting pattern information for enrollment.

A third multi-match mode may be a hybrid of the first and second multi-match modes and define both the minimum match value MIN and the maximum match value MAX for the dynamic enrollment system or process. In this third multi-match mode, a number of distinct matches of the pattern-under-test to distinct template elements of the trusted pattern template must be in a range defined by MIN and MAX in order for information from the pattern-under-test to be dynamically enrolled into the trusted pattern template. When the number of independent template element matches is less than MIN or greater than MAX, information from the pattern-under-test is disabled from being enrolled into the trusted pattern template.

These modes may be statically or dynamically defined to adjust operation of the system or process.

FIG. 1 illustrates a block schematic diagram of an embodiment for a pattern matching system 100. System 100 includes an imaging device 105, a processor 110, an input/output (I/O) system 115, a nonvolatile memory 120 and a RAM memory 125, with memory 120 and memory 125 collectively defining a memory system 130. System 100 is described, in the disclosed embodiment, as a fingerprint matching system that may be used as a pattern (e.g., fingerprint) verification system. In a fingerprint verification system, the system attempts to measure a correspondence between a pair of fingerprints (one-on-one) in order to establish, within some level of confidence, whether one pattern source (a finger) is the same or sufficiently close to another pattern source (a finger) that produces the other fingerprint. This is contrasted with an identification system that determines which pattern source (which finger belonging to which person) generated a particular fingerprint. A verification system may be used as an identification system when a decrease in power/speed is acceptable, given fixed resources. A verification system performs better as the quality of the registered images improves.

System 100 may function as a basic computer in implementing the present invention for accessing and processing fingerprints, fingerprint images, and sets of pattern information (e.g., curves) derived from a fingerprint as further described below. Processor 110 may include one or more central processing units (CPUs), selected from one or more of an x86, x64, ARM, or the like, architectures, connected to various other components, such as by a system bus.

Imaging device 105 produces an image of a fingerprint (an impression from an impressioner for example); either directly (e.g., it is a sensor or imager for a pattern source or an artifact from a pattern source) or it accesses a data structure or memory to obtain the image. The image may be of all or a portion of an entire fingerprint. Sometimes a portion of a fingerprint image may appear to be a set of discrete curves. System 100 is a computing system (e.g., an embedded computing system, a general purpose computing system, a special purpose computing system, combinations thereof, including a stored program computing platform with a processor and a coupled memory storing executable instructions) having a large number of suitable implementations for accessing and processing resources fingerprints, fingerprint images, portions of fingerprint images, and sets of curves derived from a fingerprint. Sensors that may be used with system 100 include charge-coupled devices (CCD), complementary metal oxide semiconductor (CMOS), capacitive, thermal, optical, electro-optical, RF modulation, acoustic, or other image sensing devices, such as those available from a wide range of manufacturers including IDEX ASA, Fujitsu, Atmel, Apple, Synaptics, Infineon, Sony, Integrated Biometrics, and Fingerprint Cards for example. Image arrays may be relatively small (e.g., 50×50 pixels, 128×128 pixels to a CIF size of 352×288 pixels or larger), each pixel having a pixel depth of but not limited to eight bits. System 100 uses a fingerprint image produced from device 105. In some cases, device 105 may preprocess images, such as performing image keystone corrections (a geometric correction used to account for optical distortions associated with optical/prism based systems when returning an image size proportionate to fingerprint size or image reconstruction to assemble an image taken in bands as a finger is 'swiped' across the sensor.

An operating system runs on processor 110, providing control and coordinating the functions of the various components of system 100. The operating system may be one of the commercially available operating systems such as Microsoft (e.g., windows), Apple (e.g., IOS or Mac OS X), Google (e.g., Chrome or Android), as well as UNIX and AIX operating systems, though some embodiments may use a custom control for providing minimal, tailored functions. Custom programs, controlled by the system, include sets of instructions executable on processor 110 that may be moved into and out of memory. These sets of instructions, when executed by processor 110, perform the methods and automated machine-implemented processes described herein. Device 105, I/O communication system 115, and memory system 130 are each coupled to processor 110 via a bus and with memory system 130 including a Basic Input/Output System (BIOS) for controlling the basic system functions.

I/O system 115 interconnects system 100 with outside devices or networks, enabling the system to communicate with other such systems over a communications system (e.g., directly wired, Local Area Network (LAN) or Wide Area Network (WAN), which includes, for example, the Internet, the WEB, intranets, extranets, and other public and private networks, wired, optical, or wireless). The terms associated with the communications system are meant to be generally interchangeable and are so used in the present description of the distribution network. I/O devices may also be connected to the system bus via I/O system 115. A keyboard, a pointing device (e.g., mouse, trackball or other device) and a display or indicator may be interconnected to system 100 through I/O system 115. It is through such input devices that the user may interactively relate to the programs for manipulating the resources, images, subsystems, processes and system according to the present invention. By using the aforementioned I/O devices, a user is capable of inputting information to the system through the keyboard or mouse and receiving output information from the system. System 100 may contain a removable memory component for transferring data, for example images, maps, instructions, templates, or programs.

In use, system 100 processes a set of pattern images from a pattern source (e.g., a fingerprint) to compare and evaluate an image of the pattern source, for example, against a set of patterns stored in and retrieved from memory 130. Optionally, system 100 provides the user with feedback regarding a status and/or a quality of an image reconstruction to aid in realtime impression gathering.

I/O system 115 may optionally include a display, other output or a visualization/audiblization system that supports a visualization graphic derived from a match, a reconstruction image or provides some other indication or signal to the user regarding a state, status, message, or the like from a component of system 100.

Figure 2:
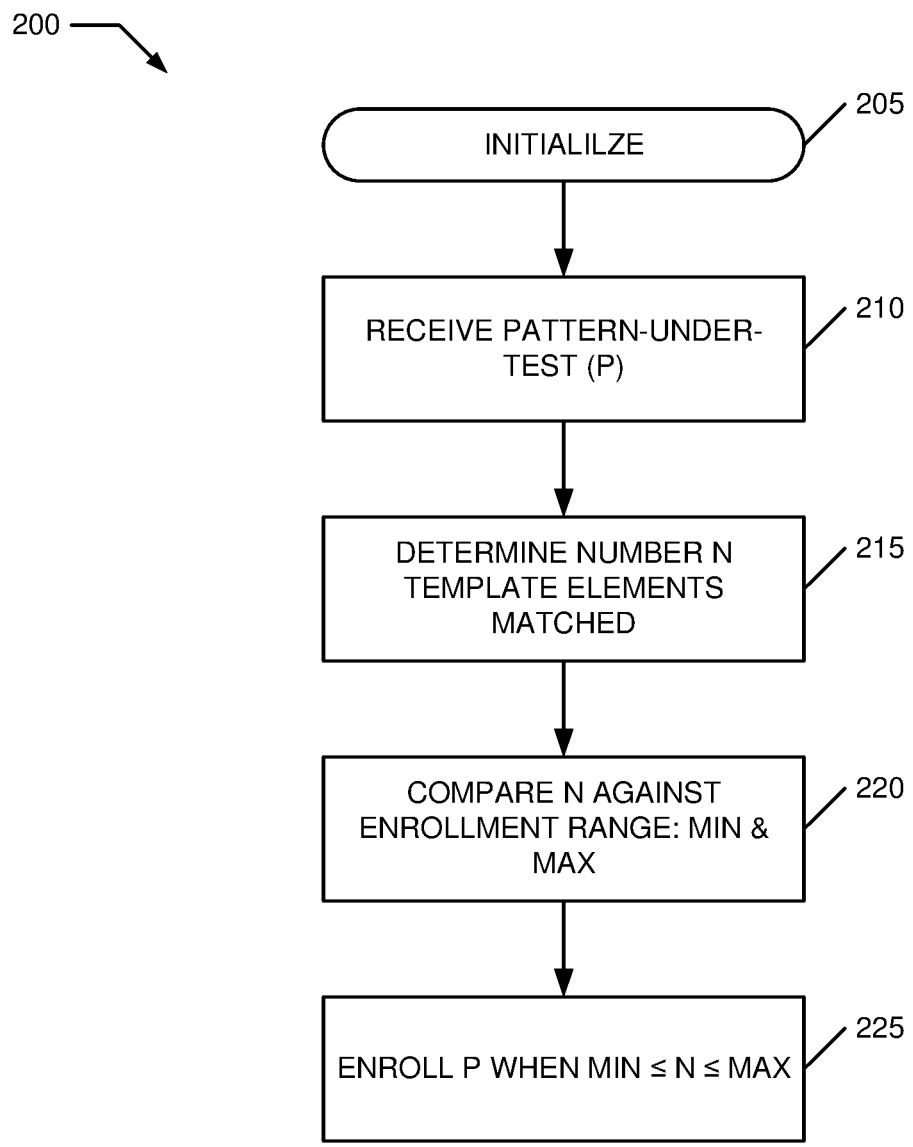
FIG. 2 illustrates a flow diagram of an embodiment for a matching process that dynamically enrolls pattern information using a multi-match model.

FIG. 2 illustrates a flow diagram of an embodiment for a matching process 200 that dynamically enrolls pattern information using a multi-match model. Process 200 may be executed by system 100 illustrated in FIG. 1 and includes a set of steps, step 205 through step 225.

Process 200 may be operated in various multi-match modes (MMs), including a first MM based upon MIN, a second MM based upon MAX, and a third MM based upon both MIN and MAX. In some implementations, process 200 may be configured statically or dynamically to set a multi-match mode before and/or during operation.

Process 200 begins with a step 205 identified herein as "START" which may initialize variables and parameters used by process 200. Step 205 may initialize a counter N representing a number N of template elements that are matched during processing, a parameter MIN which defines a minimum match value, a parameter MAX which may define a maximum match value, a number T equal to a number of template elements in a particular pattern template (which places a cap on MAX), and any other index, counters, or the like used by process 200.

After step 205, process 200 performs a step 210 which receives a pattern-under-test (P). Pattern-under-test P may be used for dynamically updating or enrolling pattern information of a trusted pattern template that may be included in a secured memory store.

After step 210, process 200 performs a step 215 which determines the number N distinct template elements of a specific trusted pattern template that are independently matched by the pattern-under-test P.

Process 200 thereafter evaluates N against MIN and MAX depending upon the particular MM that is configured. Process 200 includes a step 220 for comparison and a step 225 for dynamic enrollment, the particulars of which are informed by the MM active at the time the step is performed. As illustrated, step 220 and step 225 are configured to operate process 200 in the hybrid mode identified herein as the third MM.

Step 220 compares N against an enrollment range defined by MIN and MAX. Step 225 dynamically enrolls pattern-under-test P when N is within the enrollment range and does not enroll pattern-under-test P when N is outside the enrollment range.

Were process 200 configured for the first MM, step 220 would compare N against MIN only, the enrollment range only having a lower limit, MIN. Step 225 would dynamically enroll P unless N were less than MIN.

Were process 200 configured for the second MM, step 220 would compare N against MAX only, the enrollment range only having an upper limit, MAX. Step 225 would dynamically enroll P unless N were greater than MAX.

In some implementations having a MIN value, pattern-under-test P may be discarded irrespective of how close N was to MIN, or for those modes having a MAX, P may be discarded when it is slightly greater than MAX. In other implementations, process 200 may save such a pattern-under-test P into a special memory structure, along with the corresponding N values that "almost" equaled MIN or that "barely" failed MAX. As noted herein, some parameters such as MIN and MAX may by dynamically adjusted. After an adjustment of one or more of these values, process 200 may review any patterns-under-test P stored in the special memory structure and compare against the new set of parameter values. Those retained but previously unprocessed patterns-under-test (e.g., because N was less than the previous MIN value or was greater than the previous MAX) could be processed (update the trusted database or retested against the current state of the trusted database). An advantage for some systems would be improvement of the trusted database without collection of additional data. Further, a device that had fewer restraints on system resources such that device could store a recovery point including a state of the trusted memory at some point and record both changes to the enrollment database and the patterns-under-test and associated N values used to update the trusted memory since the recovery point. Thereafter, in a case that MIN and/or MAX changes, process 200 may reprocess the patterns-under-test from the recovery point and modify the trusted database. This may be a form of self-correcting dynamic registration. As noted, a change in the set of parameters may trigger an automatic update to the trusted database or may trigger a new test of stored patterns-under-test. In other cases, some embodiments may not store previously tested but failed patterns-under-test P and just respond to a dynamic change in the set of parameters for future patterns-under-test using the then-current set of parameters.

Process 200 could be repeated to cycle through many patterns-under-test.

Also, an article of manufacture for use with a computer processor, such as a CD, pre-recorded disk or other equivalent devices, could include a computer program storage medium and program mechanisms recorded thereon for directing the computer processor to facilitate the implementation and practice of the above described methods. Such devices and articles of manufacture also fall within the spirit and scope of the present invention.

The invention may be implemented in numerous ways, including for example as a method (including a computer-implemented method), a system (including a computer processing system, general purpose, special purpose, hybrid, embedded, and the like), an apparatus, a computer readable medium, a computer program product, a graphical user interface, a web portal, or a data structure tangibly fixed in a computer readable memory. Several embodiments of the present invention are discussed herein. The appended drawings illustrate only typical embodiments of the present invention and therefore are not to be considered limiting of its scope and breadth. The system, methods, and computer-program products have been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

System 100 may include a computer program product or software that is stored on or in a non-transitory processor readable medium. Current examples of a processor readable medium include, but are not limited to, an electronic circuit, a semiconductor memory device, a ROM, a flash memory, an erasable programmable ROM (EPROM), a floppy diskette, a compact disk (CD-ROM), an optical disk, a hard disk, and a fiber optic medium. As will be described more fully herein, the software can include a plurality of modules for performing system tasks such as performing the methods previously described herein. A processor interprets instructions to execute the software, as well as, generates automatic instructions to execute software for system responsive to predetermined conditions. Instructions from both the user interface and the software are processed by the processor for operation of system 100. In some embodiments, a plurality of processors can be utilized such that system operations can be executed more rapidly.

The system and methods above has been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A computer-implemented method for dynamically enrolling a pattern-under-test into a template image, the template image including a set of image elements, where each image element is a discrete matchable unit of the template image, wherein the method comprises:
   a) determining, using at least one processor, that a number N of distinct image elements in the template image independently match the pattern-under-test using a matching engine, wherein N is greater than one;
   b) comparing, using the at least one processor, the number N of matching distinct image elements to a threshold number of distinct image elements defined by a multi-match mode, the multi-match mode being for a dynamic enrollment of the pattern-under-test into the template image; and
   c) dynamically enrolling, using the at least one processor, the pattern-under-test into the template image based on the comparison of the number N to the threshold number.

2. The method of claim 1 wherein said multi-match mode includes a first multi-match mode defining a minimum match value MIN specifying a minimum number of distinct image elements of the template image that are to be independently matched against the pattern-under-test for the pattern-under-test to be enrolled, such that MIN≥2, and wherein step c) includes dynamically enrolling, using the at least one processor, the pattern-under-test only when N is not less than MIN.

3. The method of claim 2 wherein MIN=4.

4. The method of claim 1 wherein the set of image elements within the template image has T members, wherein said multi-match mode includes a second multi-match mode defining a maximum match value MAX specifying a maximum number of distinct image elements of the template image that are independently matched against the pattern-under-test for the pattern-under-test to be enrolled, such that MAX≤T, and wherein step c) includes dynamically enrolling, using the at least one processor, the pattern-under-test only when N is not greater than MAX.

5. The method of claim 1 wherein the set of image elements within the template image has T members, wherein said multi-match mode includes a third multi-match mode defining a minimum match value MIN specifying a minimum number of distinct image elements of the template image that are independently matched against the pattern-under-test for the pattern-under-test to be enrolled such that MIN≥2, and a maximum match value MAX specifying a maximum number of distinct image elements of the template image that are independently matched against the pattern-under-test for the pattern-under-test to be enrolled, wherein MIN<MAX≤T, and wherein step c) includes dynamically enrolling, using the at least one processor, the pattern-under-test only when N is not less than MIN and not greater than MAX.

6. The method of claim 5 wherein MIN=4.

7. The method of claim 4 wherein MAX equals a predetermined fraction of T.

8. The method of claim 5 wherein MAX equals a predetermined multiple of said minimum match value MIN.

9. The method of claim 1 wherein said multi-match mode defines a set of parameters including the threshold number of distinct image elements of the template image that are independently matched against the pattern-under-test for the pattern-under-test to be enrolled, and wherein dynamically enrolling step c) is executed based on said set of parameters, and wherein said multi-match mode includes a dynamic option configured to adjust said set of parameters during said enrolling step c).

10. The method of claim 9 wherein said set of parameters includes one or more of MIN, MAX, T, and combinations thereof; and wherein:
MIN is a minimum match value specifying a minimum number of distinct image elements of the template image that are independently matched against the pattern-under-test for the pattern-under-test to be enrolled, such that MIN≥2;
MAX is a maximum match value specifying a maximum number of distinct image elements of the template image that are independently matched against the pattern-under-test for the pattern-under-test to be enrolled, such that MAX≤T; and
T is a total number of image elements in the set of image elements.

11. A non-transitory computer-readable medium for dynamically enrolling a pattern-under-test into a template image, the template image including a set of image elements, where each image element is a discrete matchable unit of the template image, the non-transitory computer-readable medium comprising instructions that are executable by at least one processor to cause the processor to perform the steps of:
a) determining that a number N of distinct image elements in the template image independently match the pattern-under-test using a matching engine, wherein N is greater than one;
b) comparing the number N of matching distinct image elements to a threshold number of distinct image elements defined by a multi-match mode, the multi-match mode being for a dynamic enrollment of the pattern-under-test into the template image; and
c) dynamically enrolling the pattern-under-test into the template image based on the comparison of the number N to the threshold number.

12. The medium of claim 11 wherein said multi-match mode includes a first multi-match mode defining a minimum match value MIN specifying a minimum number of distinct image elements of the template image that are to be independently matched against the pattern-under-test for the pattern-under-test to be enrolled, such that MIN≥2, wherein step c) includes dynamically enrolling the pattern-under-test only when N is not less than MIN.

13. The medium of claim 12 wherein MIN=4.

14. The medium of claim 11 wherein the set of image elements within the template image has T members, wherein said multi-match mode includes a second multi-match mode defining a maximum match value MAX specifying a maximum number of distinct image elements of the template image that are independently matched against the pattern-under-test for the pattern-under-test to be enrolled, such that MAX≤T, and wherein step c) includes dynamically enrolling the pattern-under-test only when N is not greater than MAX.

15. The medium of claim 11 wherein the set of image elements within the template image has T members wherein said multi-match mode includes a third multi-match mode defining a minimum match value MIN specifying a minimum number of distinct image elements of the template image that are independently matched against the pattern-under-test for the pattern-under-test to be enrolled, such that MIN≥2, and a maximum match value MAX specifying a maximum number of distinct image elements of the template image that are independently matched against the pattern-under-test for the pattern-under-test to be enrolled, wherein MIN<MAX≤T, and wherein step c) includes dynamically enrolling the pattern-under-test only when N is not less than MIN and not greater than MAX.

16. The medium of claim 15 wherein MIN=4.

17. The medium of claim 14 wherein MAX equals a predetermined fraction of T.

18. The medium of claim 15 wherein MAX equals a predetermined multiple of said minimum match value MIN.

19. The medium of claim 11 wherein said multi-match mode defines a set of parameters including the threshold number of distinct image elements of the template image that are independently matched against the pattern-under-test for the pattern-under-test to be enrolled, and wherein step c) is executed based on said set of parameters, and wherein said multi-match mode includes a dynamic option configured to adjust said set of parameters during said step c).

20. The medium of claim 19 wherein said set of parameters includes one or more of MIN, MAX, T, and combinations thereof, wherein:
MIN is a minimum match value specifying a minimum number of distinct image elements of the template image that are independently matched against the pattern-under-test for the pattern-under-test to be enrolled, such that MIN≥2;
MAX is a maximum match value specifying a maximum number of distinct image elements of the template image that are independently matched against the pattern-under-test for the pattern-under-test to be enrolled, such that MAX≤T; and
T is a total number of image elements in the set of image elements.

* * * * *